US011881652B2

(12) United States Patent
Creazzo

(10) Patent No.: US 11,881,652 B2
(45) Date of Patent: Jan. 23, 2024

(54) ELECTRIC CONNECTION DEVICE COMPRISING CONTACTING MEANS FOR CONTROLLING AN AUXILIARY CIRCUIT

(71) Applicant: Valentini S.R.L., Turin (IT)

(72) Inventor: Sergio Creazzo, Turin (IT)

(73) Assignee: Valentini S.R.L., Turin (IT)

( * ) Notice: Subject to any disclaimer, the term of this patent is extended or adjusted under 35 U.S.C. 154(b) by 311 days.

(21) Appl. No.: 17/429,726

(22) PCT Filed: Feb. 12, 2020

(86) PCT No.: PCT/IT2020/000014
§ 371 (c)(1),
(2) Date: Aug. 10, 2021

(87) PCT Pub. No.: WO2020/170279
PCT Pub. Date: Aug. 27, 2020

(65) Prior Publication Data

US 2022/0131313 A1 Apr. 28, 2022

(30) Foreign Application Priority Data

Feb. 22, 2019 (IT) ........................ 102019000002621

(51) Int. Cl.
*H01R 13/625* (2006.01)
*H01R 13/639* (2006.01)
*H01R 13/703* (2006.01)

(52) U.S. Cl.
CPC ......... *H01R 13/625* (2013.01); *H01R 13/639* (2013.01); *H01R 13/703* (2013.01)

(58) Field of Classification Search
CPC ... H01R 13/625; H01R 13/639; H01R 13/703
See application file for complete search history.

(56) References Cited

U.S. PATENT DOCUMENTS 1,026,269 A * 5/1912 Knauff ................. H01R 13/625 439/335
1,137,295 A * 4/1915 Stearns ................ H01R 13/625 439/335

(Continued)

FOREIGN PATENT DOCUMENTS

GB 2411527 A 8/2005

OTHER PUBLICATIONS

International Search Report of the ISA/EP in PCT/IT2020/000014, dated Jul. 7, 2020; 11pgs.

*Primary Examiner* — Thanh Tam T Le
(74) *Attorney, Agent, or Firm* — Haukaas Fortius PLLC; Michael Haukaas

(57) ABSTRACT

An electric connection device including a first electric connection element, a second electric connection element, a locking and unlocking mechanism configured to couple and uncouple the first and the second connecting elements following the rotation of one with respect to the other, a secondary safety locking mechanism, configured to prevent the rotation of the first and of the second connecting elements one with respect to the other and the consequent separation of the two elements, and further comprising electrical contact associated with the connecting elements and configured for controlling an auxiliary circuit connected thereto, and actuating element configured to actuate the electrical contact.

9 Claims, 6 Drawing Sheets

(56) References Cited

U.S. PATENT DOCUMENTS

| | | | | | |
|---|---|---|---|---|---|
| 2,704,356 | A * | 3/1955 | Herterick | H01R 13/2421 | 439/333 |
| 2,729,800 | A * | 1/1956 | Knudsen | H01R 13/2421 | 439/335 |
| 3,184,703 | A | 5/1965 | Piscitello et al. | | |
| 4,440,464 | A * | 4/1984 | Spinner | H01R 27/00 | 439/314 |
| 4,550,967 | A * | 11/1985 | Riches | H01R 13/6278 | 439/345 |
| 4,895,530 | A * | 1/1990 | Gugelmeyer | H01R 13/623 | 439/387 |
| 5,108,297 | A * | 4/1992 | Hoffman | H01R 13/625 | 439/304 |
| 5,641,310 | A * | 6/1997 | Tiberio, Jr. | H01R 13/625 | 439/680 |
| 5,685,730 | A * | 11/1997 | Cameron | H01R 13/6397 | D13/133 |
| 5,895,282 | A * | 4/1999 | Little | H01R 13/625 | 439/372 |
| 6,022,235 | A * | 2/2000 | Zhang | H01R 24/005 | 439/334 |
| 6,109,960 | A * | 8/2000 | Cooper | H01R 33/94 | 439/546 |
| 6,206,714 | B1 * | 3/2001 | Bernardini | H01R 13/213 | 439/166 |
| 6,297,741 | B1 * | 10/2001 | Higgins | F16B 7/20 | 439/337 |
| 6,309,231 | B1 * | 10/2001 | Gordon | H01R 13/625 | 439/889 |
| 6,808,407 | B1 * | 10/2004 | Cannon | H01R 13/625 | 439/314 |
| 8,052,480 | B2 * | 11/2011 | Hauser | H01R 13/24 | 439/672 |
| 10,158,193 | B2 * | 12/2018 | Scheibe | H01R 13/6584 | |
| 2018/0316127 | A1 | 11/2018 | Fujimori et al. | | |

* cited by examiner

ELECTRIC CONNECTION DEVICE COMPRISING CONTACTING MEANS FOR CONTROLLING AN AUXILIARY CIRCUIT

RELATED APPLICATIONS

This application is a National Stage filing under 35 U.S.C. § 371 of International Application No. PCT/IT2020/000014 filed Feb. 12, 2020, which claims priority to Italian Patent Application No. 102019000002621 filed Feb. 22, 2019, which applications are incorporated herein by reference.

BACKGROUND

Field of Invention

The present invention refers to an electric connection device.

In particular, the invention refers to an electric connection device, comprising a first connection element designed to be coupled with a second connection element through a bayonet-type locking mechanism and through a secondary locking mechanism configured to prevent the accidental disconnection of the two connecting elements, further comprising contacting means, for example a switch, for controlling an auxiliary circuit. The first connection element and the second connection element are configured for performing a power electric connection, for example with currents up to 750 A.

Related Art

Electric connection devices are known, for example from U.S. Pat. No. 5,685,730, comprising two connecting elements, configured to be blocked through a bayonet-type locking mechanism which provides that the two elements are pressed one towards the other and blocked following the rotation of one related to the other, further comprising a secondary locking mechanism of said connecting elements, having a spring-loaded safetypine which prevents the mutual rotation of the two elements, said secondary locking mechanism requiring a suitable unlocking tool.

These known electric connection devices have the advantage that they prevent, through the secondary locking mechanism, both the accidental unlocking of the two connecting elements, and the unlocking by people not equipped with the suitable unlocking tool since not authorized, operation which can be dangerous, especially if the connector is at a high voltage.

However, these known electric connection devices do not provide the chance of automatically controlling an auxxiliary device, for example to avoid voltaic arcs between the electric contacts of the two connecting elements, to allow connecting the two elements under load or allow, when the two elements are coupled, automatically actuating protecting, controlling, sectioning or signalling devices, or, through an external circuitry to the current device, determining a connection sequence when many connection devices have to operate on the same plant or circuit.

Documents US-A1-2018/316127, U.S. Pat. No. 5,685,730, GB-A-2 411 527 and U.S. Pat. No. 3,184,703 disclose electric connection devices according to the preamble of claim 1.

SUMMARY OF THE INVENTION

Object of the present invention is providing an electric connection device comprising two connecting elements designed to be mutually coupled through a bayonet-type locking mechanism and through a secondary, pin-type locking mechanism configured to prevent the accidental disconnection of the two connecting elements, further comprising electric contacting means associated with the first connection element and/or the second connection element and configured for controlling an auxiliary circuit connected thereto.

The above and other objects and advantages of the invention, as will result from the following description, are obtained with an electric connection device as claimed in the independent claim. Preferred embodiments and non-trivial variations of the present invention are the subject matter of the dependent claims.

It is intended that the enclosed claims are an integral part of the present description.

It will be immediately obvious that numerous variations and modifications (for example related to shape, sizes, arrangements and parts with equivalent functionality) can be made to what is described, without departing from the scope of the invention as defined in the enclosed claims.

BRIEF DESCRIPTION OF THE DRAWINGS

The present invention will be better described by some preferred embodiments thereof, provided as a non-limiting example, with reference to the enclosed drawings, in which.

DETAILED DESCRIPTION

Figure 1:
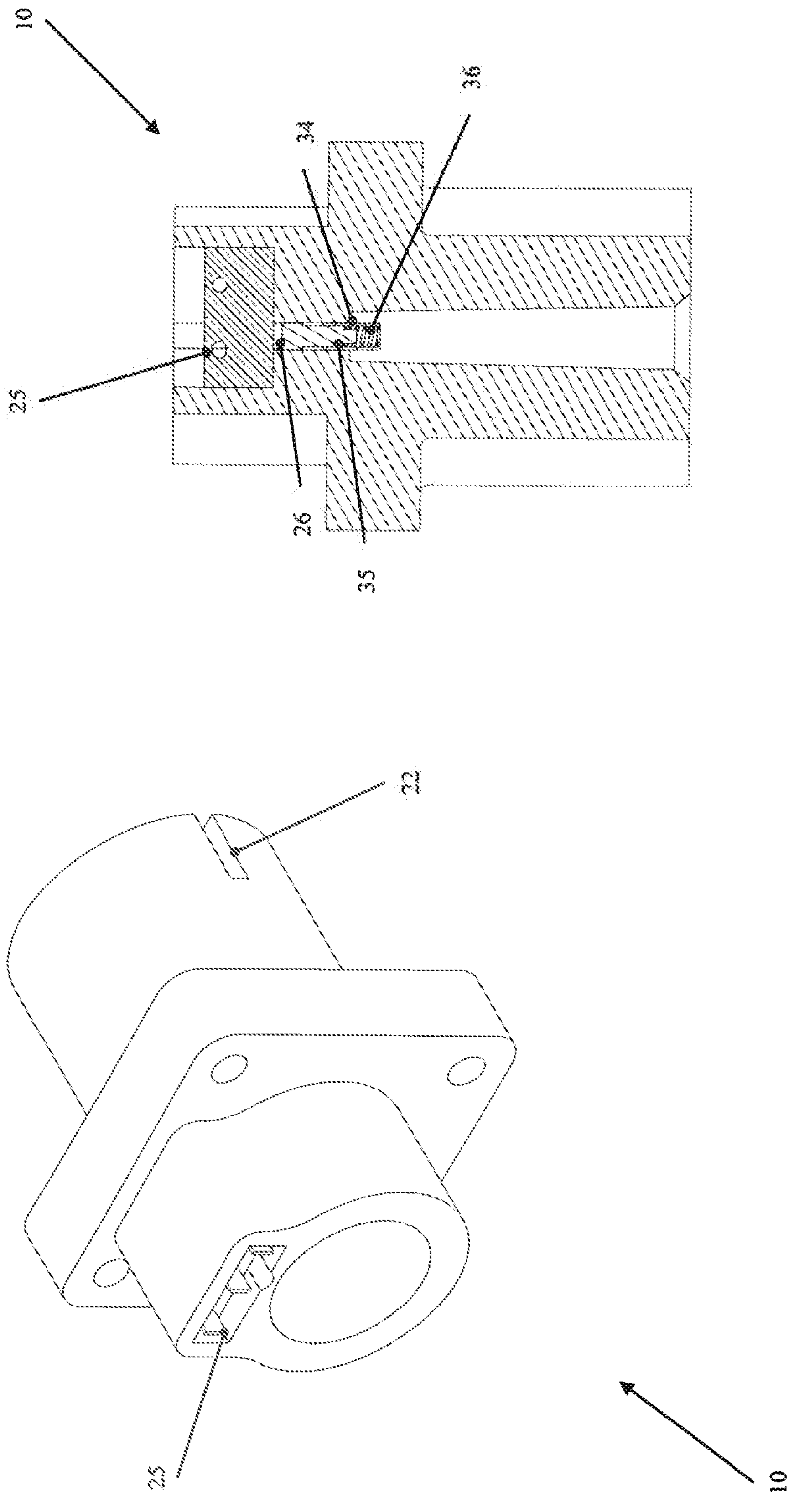
FIG. 1 shows a perspective view and a sectional view of a first embodiment of an element of an electric connection device according to the present invention.
Figure 2:
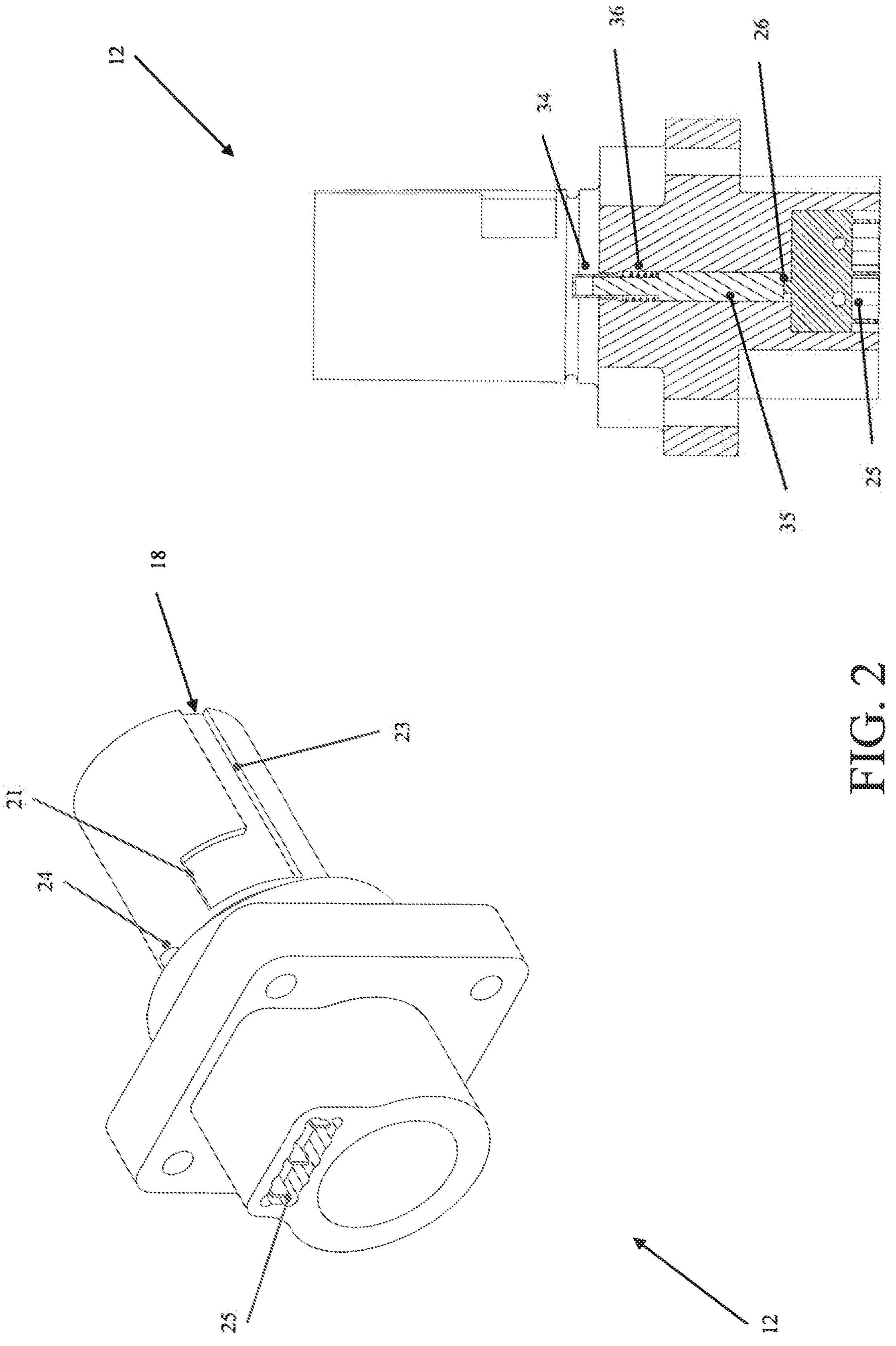
FIG. 2 shows a perspective view and a sectional view of a second embodiment of an element of an electric connection device according to the present invention.

With reference to the Figures, preferred embodiments of the electric connection device according to the present invention are shown and described.

The electric connection device of the invention comprises a first electric connection element 10, for example of the male type, preferably a front capsule or a flange of the female type for its fastening on a panel, connectable to a second electric connection element 12, for example of the female type, in particular a front capsule or a flange of the female type for its fastening on a cable, said first 10 and second 12 electric connection elements being mutually electrically connectable by means of respective electric contacts, in a preferred way power contacts; a locking and unlocking mechanism, for example of the bayonet type, configured to couple the first connection element 10 and the second connection element 12 following the rotation of one with respect to the other in a first direction and to uncouple said first connection element 10 and said second connection element 12 following the rotation of one with respect to the other in a second direction, opposite to the first; a secondary safety locking mechanism, configured to prevent the rotation of the first connection element 10 and of the second connection element 12 one with respect to the other in said second direction and the consequent separation of the two elements 10 and 12, in order to keep blocked the first connection element 10 and the second connection element 12 to guarantee the electric connection, said secondary safety locking mechanism comprising locking means 22, 24 configured to keep blocked the first connection element 10 and the second connection element 12 and to be unlocked by suitable unlocking means of a known type.

In a preferred way, the locking means 22, 24 are retractable and comprise a seat, in a preferred way obtained on the external surface of the first connection element 10, a pin, in a preferred way inserted into a housing obtained in the second connection element 12, and an elastic element, for example a spring, contiguous to the pin, also inserted into the housing; said secondary locking mechanism requires, to be unlocked, the insertion of the suitable unlocking means into the seat which determine the retraction of the pin in the housing in order to allow the rotation of said first and second connection elements 10, 12 one with respect to the other in the second direction, which generates their separation.

The electric connection device of the invention further comprises electric contacting means 25, associated with the first connection element 10 and/or the second connection element 12, and configured for controlling an auxiliary controlling/signalling circuit connected thereto, comprising for example contactors or switches, said electric connection device comprising actuating means 26, 34 configured to actuate the electric contacting means 25 when the first electric connection element 10 and the second electric connection element 12 are mutually electrically connected; preferably, the actuating means 26, 34 are configured to get in contact with the first 10 or the second 12 connecting element, during the coupling of the first connection element 10 and of the second connection element 12, and be pushed thereto in contact with the electric contacting means 25, to actuate them.

In a preferred way, the actuating means 26, 34 are configured to keep actuated the electric connection means 25 when the locking means 22, 24 block the first connection element 10 and the second connection element 12.

In a known way, the bayonet-type locking mechanism is configured so that, when the first connection element 10 and the second connection element 12 are pushed one towards the other to be coupled, at least one projecting element 37 of a known type, obtained on the internal surface of the first connection element 10 and configured to be placed next to at least one "L"-shaped groove 18, obtained on the external surface of the second connection element 12, and slide inside a first length 23 of the groove 18, till they reach a second length 21 of said groove 18, after that, when the first and the second connection element 12, are rotated along the first direction to be coupled, the projecting element slides inside said second length 21 of the groove 18; preferably, the connecting elements 10, 12, comprise two projecting elements, and two "L"-shaped grooves 18. In a known way, when the first 10 and the second 12 connecting elements are rotated along the first direction and the projecting element 37 of the first connection element 10 slides inside the second length 21 of the groove 18, in the second connection element 12, the pin 24 gets in contact with the first connection element 10 which pushes it inside the housing obtained in the second connection element 12 compressing the spring, and after that the pin 24 retracted in the housing slides, following the rotation of the connecting elements 10, 12, till it meets the seat 22 of the first connection element which implies that the pin 24, not in contact any more with the first element 10, is pushed bz the spring decompression inside the seat 22, locking the first and second connection elements 12 in such a way that it prevents their mutual rotation; preferably, the actuating means 26, 34 are configured to actuate the electric connection means 25 when the projecting element 37, obtained on the internal surface of the first connection element 10, slides inside the first length 23 of the groove 18.

The actuating means 26, 34 are retractable and comprise a bar which is pushed in contact with the actuating means 26 of the electric contacting means to actuate them when the first electric connection element 10 and the second electric connection element 12 are mutually connected.

Figure 3:
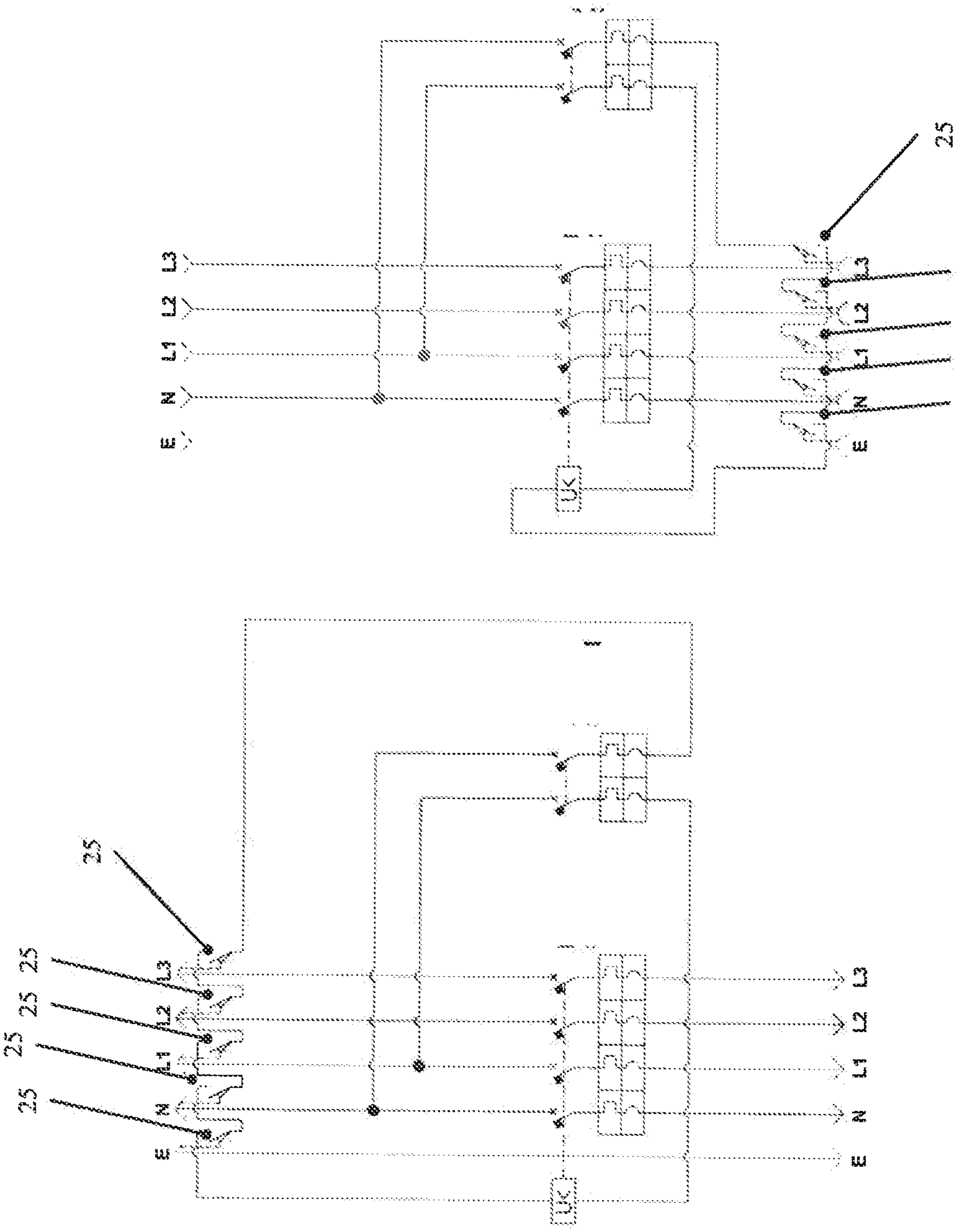
FIG. 3 shows a connection diagram of electric connection devices according to the present invention.
Figure 4:
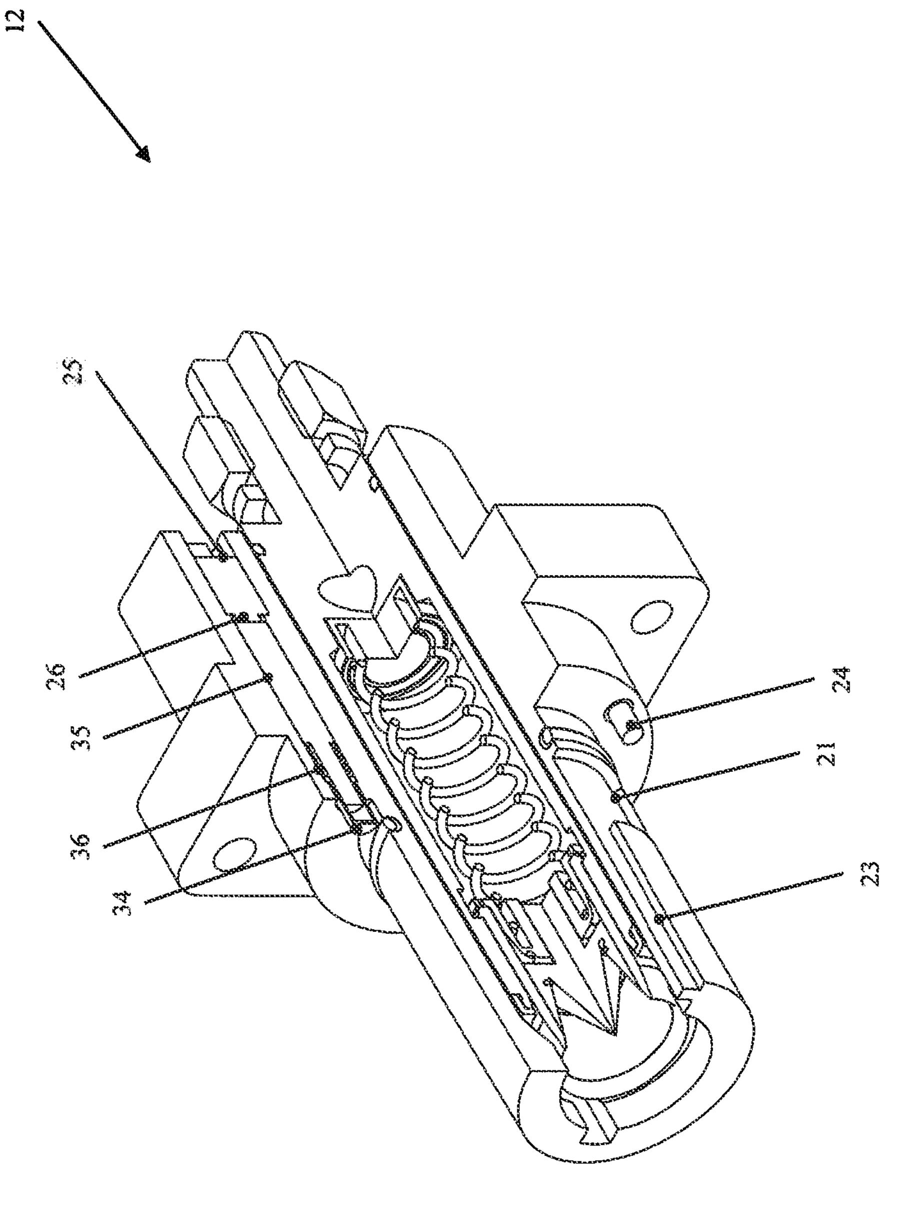
FIG. 4 shows a perspective sectional view of a second embodiment of an element of an electric connection device according to the present invention.
Figure 5:
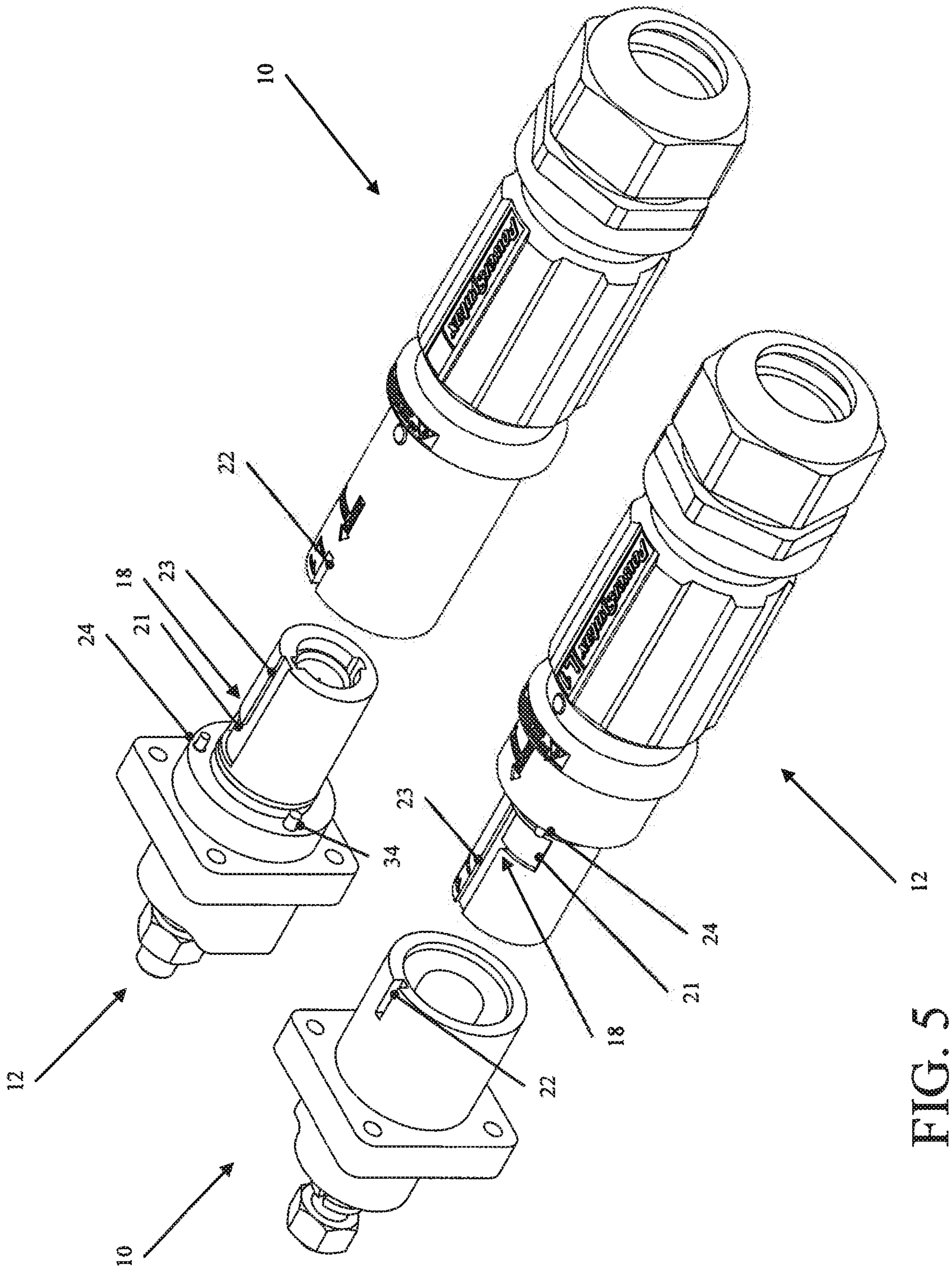
FIG. 5 shows a perspective view of two embodiments of an electric connection device according to the present invention.
Figure 6:
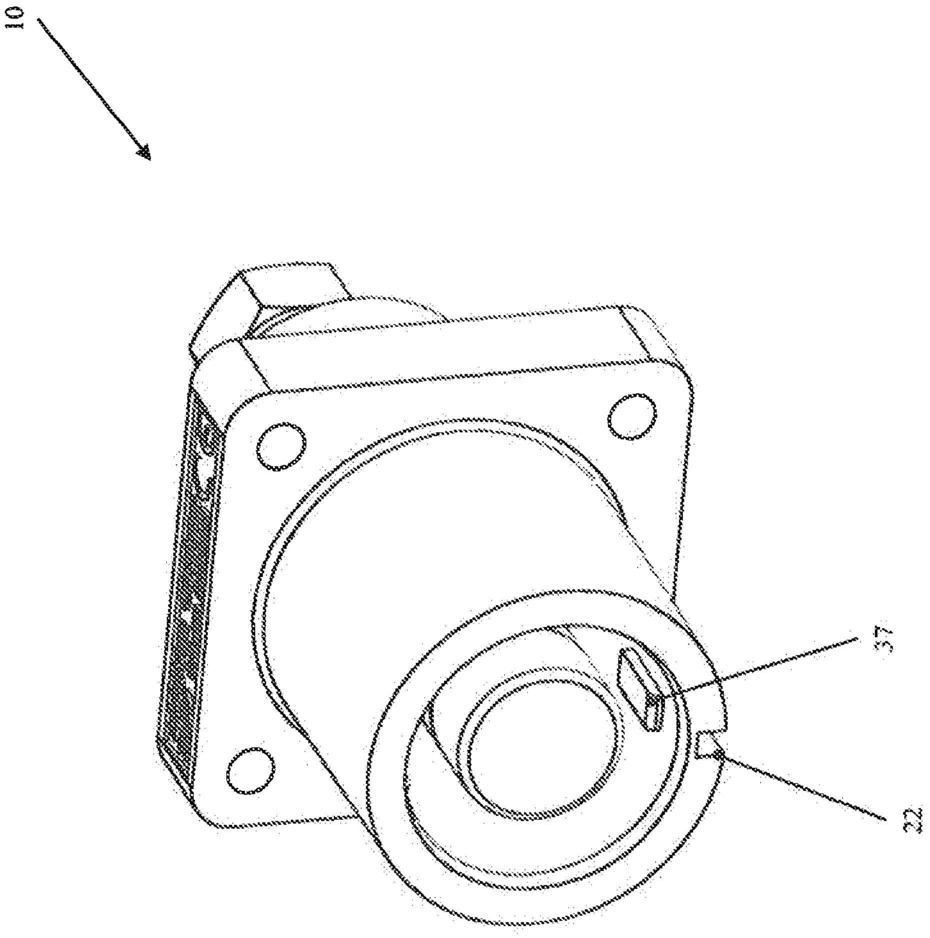
FIG. 6 shows a perspective view of the element according to the embodiment of FIG. 1.

In a first embodiment of the electric connection device of the invention, the actuating means 26, 34 comprise a retractable bar, in a preferred way inserted into a housing 35 obtained in the second connection element 12, and preferably an elastic element 36, for example a spring, contiguous to the bar, also inserted into the housing 35; when the connecting elements 10, 12 are connected, the bar gets in contact with the first connection element 10 and is pushed inside the housing 35 obtained in the second connection element 12, compressing the elastic element 36, its end is pushed in contact with the actuating means 26 of the electric contacting means 25, for example composed of a miniaturized microswitch with common-NO-NC contact, and actuates them, for example actuates the microswitch to control the circuits connected thereto. An example of a connection diagram among connecting elements 10, 12 comprising the switches is shown in FIG. 3, wherein the switches provide the consent to the connection of the phase conductors L1, L2, L3, neutral N and earth E when the connecting elements 10, 12 are correctly coupled.

In a second embodiment of the electric connection device of the invention, the actuating means 26, 34 comprise a retractable bar, in a preferred way inserted into a housing 35 obtained in the first connection element 10, and preferably an elastic element 36, for example a spring, contiguous to the bar, also inserted into the housing 35; when the connecting elements 10, 12 are connected, the bar gets in contact with the second connection element 12 and is pushed inside the housing 35 obtained in the first connection element 10, compressing the elastic element 36, and its end is pushed in contact with the actuating means 26 of the electric contacting means 25 to actuate them similarly to what is described with reference to the electric connection device of the first embodiment; in a preferred way, the housing 35 is obtained on the internal surface of the first connection element 10.

In its operation, when coupling the first connection element 10 and the second connection element 12, when the projecting element 37, obtained on the internal surface of the first connection element 10, slides inside the first length 23 of the groove 18, the bar arrives in contact with the first 10 or the second 12 connecting elements which pushes inside the housing obtained in the first connection element 10, for example compressing the spring, and its end is pushed in contact with the electric contacting means 25, and actuates them, for example actuates the microswitch to control the circuits connected thereto.

Advantageously, the electric connection device of the invention allows automatically controlling, when coupling the two connecting elements, an auxiliary function associated thereto, for example an auxiliary circuit to allow connecting the two elements under load or allow, when the two elements are coupled, automatically actuating devices connected to the circuit.

The invention claimed is:

1. An electronic connection device comprising:

a first electric connection element;

a second electric connection element connectable to said first electric connection element by means of respective electric contacts;

a locking and unlocking mechanism configured to couple and uncouple the first connection element and the second connection element following a rotation of one with respect to the other;

a secondary safety locking mechanism, configured to prevent the rotation of the first connection element and of the second connection element one with respect to the other and the consequent separation of the two elements;

an electric contact associated with the first connection element and/or the second connection element and configured for controlling an auxiliary circuit connected thereto; and actuating element configured to actuate the electric contact when the first electric connection element and the second electric connection element are mutually connected, characterized in that the actuating element is retractable and comprises a bar which is pushed in contact with the actuating element to actuate the electric contact when the first electric connection element and the second electric connection element are mutually connected.

2. The electronic connection device according to claim 1, wherein the actuating element is configured to keep actuated the electric contact when the secondary safety locking mechanism blocks the first connection element and the second connection element.

3. The electronic connection device according to claim 1, wherein the locking and unlocking mechanism is a bayonet mechanism and comprises a projecting element obtained on the internal surface of the first connection element and configured to be placed next to at least one "L"-shaped groove, obtained on the external surface of the second connection element, and slide inside a first length of the groove, and characterized in that the actuating element is configured to actuate the electric contact when the projecting element slides inside the first length of the groove.

4. The electronic connection device according to claim 1, wherein the secondary safety locking mechanism comprises locking element configured to keep locked the first connection element and the second connection element and to be unlocked by suitable unlocking element, and characterized in that the actuating element is configured to actuate the electric contact when the locking element lock the first connection element and the second connection element.

5. The electronic connection device according to claim 1, wherein the actuating element is configured to contact the first or the second connecting element, when mutually coupled, and be pushed thereto in contact with the electric contact, to actuate the electric contact.

6. The electronic connection device according to claim 1, wherein the actuating element comprising the bar is inserted into a housing obtained in the first or in the second connecting element.

7. The electronic connection device according to claim 6, further comprising an elastic element contiguous to the bar and inserted into the housing.

8. The electronic connection device according to claim 6, wherein the housing is obtained on the internal surface of the first connection element.

9. The electronic connection element comprising contact for controlling an auxiliary circuit connected thereto, configured to be used in an electric connection device according to claim 1.

* * * * *